US007936251B1

(12) United States Patent
Hamaguchi et al.

(10) Patent No.: US 7,936,251 B1
(45) Date of Patent: May 3, 2011

(54) ALERTING DEVICE AND RADIO COMMUNICATION DEVICE HAVING THE ALERTING DEVICE

(75) Inventors: Toshihide Hamaguchi, Higashiosaka (JP); Hirokazu Genno, Hirakata (JP)

(73) Assignee: Kyocera Corporation, Kyoto (JP)

( * ) Notice: Subject to any disclaimer, the term of this patent is extended or adjusted under 35 U.S.C. 154(b) by 1764 days.

(21) Appl. No.: 09/582,874

(22) PCT Filed: Dec. 28, 1998

(86) PCT No.: PCT/JP98/06014

§ 371 (c)(1), (2), (4) Date: Jul. 6, 2000

(87) PCT Pub. No.: WO99/34934

PCT Pub. Date: Jul. 15, 1999

(30) Foreign Application Priority Data

| | | |
|---|---|---|
| Jan. 8, 1998 | (JP) | 10-002501 |
| Apr. 16, 1998 | (JP) | 10-105276 |
| Sep. 21, 1998 | (JP) | 10-266748 |

(51) Int. Cl.
*H04Q 1/00* (2006.01)
*G08B 5/22* (2006.01)

(52) U.S. Cl. ........................................ 340/7.6; 340/7.1

(58) Field of Classification Search .................. 340/7.6, 340/7

See application file for complete search history.

(56) References Cited

U.S. PATENT DOCUMENTS 3,623,064 A * 11/1971 Kagan ........................... 340/7.6
3,628,150 A * 12/1971 Ditthardt ...................... 340/7.43
4,674,069 A * 6/1987 Mizuno ........................... 367/90
4,727,331 A * 2/1988 Hegeler ........................ 327/175
5,524,061 A 6/1996 Mooney et al. ............... 381/151
5,649,020 A * 7/1997 McClurg et al. .............. 381/151
5,754,096 A * 5/1998 Muto et al. ................. 340/407.1
5,828,295 A * 10/1998 Mittel et al. ............... 340/407.1
5,936,516 A * 8/1999 Narea et al. ................ 340/407.1
6,208,237 B1 * 3/2001 Saiki et al. ................. 340/388.1

FOREIGN PATENT DOCUMENTS

CA 2096882 11/1994

(Continued)

OTHER PUBLICATIONS

European Search Report dated Jan. 28, 2003.

(Continued)

*Primary Examiner* — Brian A Zimmerman

(74) *Attorney, Agent, or Firm* — Edwards Angell Palmer & Dodge LLP

(57) ABSTRACT

In a notifying device comprising a notifying unit 2 having incorporated therein a vibrator to be resonated by a drive signal fed thereto, and a signal preparing circuit 5 for feeding the drive signal to the notifying unit 2, the signal preparing circuit 5 prepares a drive signal Dv varying in frequency within a predetermined range including the resonance frequency of the vibrator of the unit 2 and feeds the signal to the notifying unit 2. The variation of frequency of the drive signal is determined in correspond relation with a variation in the resonance frequency of the vibrator due to tolerances for specifications which govern the resonance frequency. The drive signal has an alternating waveform of rectangular waves or sine waves, and the frequency thereof varies periodically from 1.37 to 2.98 Hz. The notifying device achieves a satisfactory notifying effect despite the variation of the resonance frequency of the vibrator.

15 Claims, 10 Drawing Sheets

FOREIGN PATENT DOCUMENTS

| | | | |
|---|---|---|---|
| EP | 0 709 812 | A2 | 5/1996 |
| EP | 0791405 | A2 | 8/1997 |
| GB | 2 268 663 | | 1/1994 |
| GB | 2 287 377 | | 9/1995 |
| JP | 06-118964 | | 4/1994 |
| JP | 08-238901 | | 9/1996 |
| JP | 09-098205 | | 4/1997 |
| JP | 09-307631 | | 11/1997 |
| JP | 10-056498 | | 2/1998 |
| JP | 10-93672 | | 4/1998 |
| JP | 10-258253 | | 9/1998 |
| WO | 96/27974 | | 9/1996 |

OTHER PUBLICATIONS

Chinese Office Action dated Jun. 6, 2003.

European Search Report dated Jun. 17, 2004.

Korean Patent Office Communication for corresponding Korean Patent Application No. 519980961320 dated Jan. 24, 2005.

* cited by examiner (a)

(b)

ALERTING DEVICE AND RADIO COMMUNICATION DEVICE HAVING THE ALERTING DEVICE

TECHNICAL FIELD

The present invention relates to notifying devices for use in portable telephones, pagers and like wireless communications systems for notifying the user of incoming calls.

BACKGROUND ART

Conventional portable telephones have incorporated therein a sound generator (ringer) for notifying the user of incoming calls with sound, i.e., with a vibration having a frequency in the audible range and a vibration generator for notifying the user of incoming calls with a vibration perceivable by the human body and having a frequency, for example, of up to hundreds of hertz. One of the two generators is selectively usable according to the situation.

However, small devices such as portable telephones have little or no excessive space for accommodating both the sound generator and the vibration generator, and therefore encounter the problem of becoming greater in size if equipped with the two generators.

Accordingly, the present applicant has proposed a portable telephone as shown in FIG. 9 (JP-A No. 14194/1998). The proposed portable telephone comprises a flat case 11 having an antenna 1 and provided on the surface thereof with a speech receiving portion 12 for outputting the voice of incoming speech, manual buttons 14 such as numerical keys, a speech delivery portion 13 for inputting the voice of outgoing speech, etc. Provided in a suitable portion of the interior of the case 11 is a notifying unit 2 for notifying the user of incoming calls with sound, vibration or both sound and vibration.

The notifying unit 2 comprises a first vibrator drivable with a first drive signal at a frequency in the audible range for producing sound waves, a second vibrator drivable with a second drive signal at a second frequency (up to hundreds of hertz) lower than the first frequency for producing a vibration, and a signal generator circuit for producing the first drive signal and the second drive signal. The first vibrator and the second vibrator are housed in a common casing. The first vibrator comprises a coil attached by a first diaphragm to the casing, while the second vibrator comprises a magnet attached by a second diaphragm to the casing. The magnet is formed with a magnetic gap having the coil of the first vibrator accommodated therein.

Stated more specifically with reference to FIG. 2, the notifying unit comprises as housed in a cylindrical casing 21 a first vibrator 4 for producing sound waves mainly and a second vibrator 3 for producing vibration mainly. The casing 21 has a compact structure in its entirety and comprises a hollow cylindrical body 22, an annular front cover member 24 having a sound emitting aperture 25 and attached to an open front side of the body 22, and an annular rear cover member 23 attached to an open rear side of the body 22.

The first vibrator 4 comprises a circular first diaphragm 41 having its peripheral portion held between the casing body 22 and the front cover member 24, and a coil 42 fixed to the rear side of the first diaphragm 41. The first vibrator 4 has a resonance frequency in an audible range in excess of hundreds of hertz.

On the other hand, the second vibrator 3 comprises an annular second diaphragm 34 having its peripheral portion held between the casing body 22 and the rear cover member 23, an outer yoke 32 secured to the inner peripheral portion of the second diaphragm 34, a permanent magnet 31 magnetized axially thereof (vertical direction) and fixed to the front side of the outer yoke 32, and an inner yoke 33 fixed to the front side of the magnet 31. The coil 42 of the first vibrator 4 is accommodated upwardly or downwardly movably in an annular magnetic gap defined by opposed faces of the outer yoke 32 and the inner yoke 33. The second vibrator 3 has a low resonance frequency of lower than hundreds of hertz.

FIG. 11 shows the vibration characteristics Cs of the first vibrator 4 and the vibration characteristics Cv of the second vibrator 3. The vibrators 4, 3 exhibit a peak in amplitude at the resonance frequencies Fs, Fv, respectively.

Accordingly, great notification effects are available by feeding a sound drive signal and a vibration drive signal of these respective resonance frequencies Fs, Fv to the coil 42 of the notifying unit 2.

More specifically, a sound drive signal Ds of a frequency (for example, about 2 kHz) in match with the resonance frequency Fs as shown in FIG. 10, (a) is fed to the coil 42 when notifying with sound, and a vibration drive signal Dv' of a frequency (for example, about 100 Hz) in match with the resonance frequency Fv as shown in FIG. 10, (b) is fed to the coil 42 when notifying with vibration.

When the sound drive signal Ds is fed to the coil 42 of the notifying unit 2, the coil 42 produces an axial drive force by virtue of the relationship between the magnetic lines of force extending through the magnetic gap radially thereof and the circumferential current flowing through the coil 42 according to the Fleming's left-hand rule. Since the drive force acts at the frequency of the resonance point, the first vibrator 4 resonates to generate sound waves, while the second vibrator 3 remains almost free of vibration because the resonance point thereof is different. The generation of sound waves gives audio notification of an incoming call.

On the other hand, when the vibration drive signal Dv' is fed to the coil 42 of the notifying unit 2, the coil 42 similarly produces an axial drive force. Since the resonance point of the first vibrator 4 differs from the frequency of the drive force, the first vibrator 4 undergoes almost no vibration, but the second vibrator 3 which has a resonance point at the frequency of the drive force is resonated by the reaction of the drive force to produce vibration. The vibration generated is perceived by the human body, notifying the user of an incoming call.

With the notifying unit 2, the resonance frequencies of the vibrators 4, 3 inevitably involve variations due to tolerances for the specifications for determining the resonance frequencies of the vibrators 4, 3, such as the configurations, dimensions, materials, etc. of the diaphragms 41, 34, yokes 32, 33 and permanent magnet 31. For example, the thickness of the second diaphragm 34 constituting the second vibrator 3 has a tolerance of 120 μm±8 μm. In the case where the resonance frequency Fv is 100 Hz when the diaphragm thickness t is 120 μm, the variation in the resonance frequency is 100 Hz±10 Hz since the resonance frequency Fv is in proportion to the thickness t raised to the index 1.5.

FIG. 12 shows vibration characteristics a in a solid line as varied by dimensional tolerances, etc. to vibration characteristics b, c in a broken line, respectively. If a vibrator having the vibration characteristics b involving a variation is driven at the resonance frequency of the vibration characteristics a with no variation, no resonance occurs, and the amplitude of the vibrator will greatly decrease from a peak value Wp at the resonance point to a value W'. Thus in the case where the notifying unit is driven with a drive signal of given frequency without considering the variation of the resonance frequency, there arises the problem that variations occur also in the amplitude of the vibrator, failing to produce a satisfactory notifying effect.

Further portable telephones in recent years can be set in various operation modes, for example, to display the telephone number of the caller upon receiving an incoming call or to serve as a pager. In conformity with such a wider variety of operational functions, there arises a need for the notifying unit to give notification not only of incoming calls but also of the various modes in which the telephone is set.

Accordingly, a first object of the present invention is to provide a notifying device which produces to satisfactory notifying effects despite the variation in resonance frequency, and a wireless communications system incorporating the device.

A second object of the invention is to provide a wireless communications system comprising a notifying device adapted for different kinds of notifying operations including notification of incoming calls to give satisfactory notifying effects despite the variation in resonance frequency.

DISCLOSURE OF THE INVENTION

To fulfill the first object, the present invention provides a notifying device comprising a vibrator to be resonated by a drive signal fed thereto, and a signal preparing circuit for feeding the drive signal to the vibrator, the notifying device being characterized in that the drive signal has a frequency which varies within a range including the resonance frequency of the vibrator and matches the resonance frequency during variation.

Even if the vibrator has a resonance frequency involving a variation due to dimensional tolerances, etc. of the vibrator, the drive signal repeatedly varies in frequency within the predetermined range, so that resonance occurs to give a great amplitude when the frequency of the drive signal matches the true resonance frequency during the variation. When the frequency of the drive signal thereafter becomes different from the true resonance frequency, the vibrator undergoes no resonance and exhibits a diminished amplitude, whereas the amplitude increases when the signal frequency matches the true resonance frequency again. In this way, the amplitude of the vibrator repeatedly increases to the amplitude of resonance as a peak and decreases therefrom as the frequency of the drive signal varies.

Stated more specifically, the variation in the frequency of the drive signal corresponds to the variation in the resonance frequency due to tolerances for the specifications on which the resonance frequency is dependent. The variation in the resonance frequency due to tolerances for the specifications can be determined experimentally, empirically or theoretically, and the variation in the frequency of the drive signal can be determined reasonably when made to correspond to the variation thus determined.

The resonance frequency of the vibrator is an actually inaudible low frequency, for example, of up to hundreds of hertz, and the vibration of the vibrator at the resonance frequency has an amplitude which is generally perceivable by the human body, whereby a perceivable notifying effect can be obtained.

The drive signal has an alternating waveform of pulses or sine waves having a frequency which periodically varies preferably at 0.5 to 10 Hz, more preferably at 1.37 to 2.98 Hz, most preferably at 2.18 Hz. This periodically produces resonance of highly perceivable effect.

The frequency of the drive signal further varies in the form of triangular waves, sine waves or sawtooth waves. Especially when the frequency of the drive signal is varied in the form of sawtooth waves, resonance occurs with a definite period in match with the period of the waves, ensuring notification without discomfort. The frequency of the drive signal need not always be varied continuously but may be gradually increased or decreased stepwise.

The present invention provides a wireless communications system comprising the notifying device of the invention described for notifying the user of incoming calls. The system produces a satisfactory notifying effect even if the resonance frequency of the notifying device involves a variation, thus giving reliable notification of incoming calls.

With the notifying device and the wireless communications system incorporating the device according to the invention, periodic or nonperiodic occurrence of resonance repeatedly increases the amplitude of the vibrator to the amplitude of resonance as a peak and decreases the amplitude from the peak, affording effective notification which is audible or perceivable by the human body.

To fulfill the second object, the present invention provides a wireless communications system which has incorporated therein a notifying device for performing different kinds of notifying operations including notification of incoming calls, the notifying device comprising a vibrator to be resonated by a drive signal fed thereto, and a drive signal feed circuit for feeding the drive signal to the vibrator. The drive signal feed circuit comprises command signal preparing means for preparing notification command signals which are different for different contents of notification in conformity with the content, and drive signal preparing means operative in response to the notification command signal to prepare a drive signal which varies in frequency within a range including the resonance frequency of the vibrator and which differs in the state of variation for the different notification command signals and to feed the drive signal to the vibrator.

Even if the vibrator has a resonance frequency involving a variation due to dimensional tolerances, etc. of the vibrator, the drive signal repeatedly varies in frequency within the predetermined range, so that resonance occurs to give a great amplitude when the frequency of the drive signal matches the true resonance frequency during the variation. When the frequency of the drive signal thereafter becomes different from the true resonance frequency, the vibrator undergoes no resonance and exhibits a diminished amplitude, whereas the amplitude increases when the signal frequency matches the true resonance frequency again. In this way, the amplitude of the vibrator repeatedly increases to the amplitude of resonance as a peak and decreases therefrom as the frequency of the drive signal varies.

Further in response to an incoming call or in accordance with other operation of the system, a specific notification command signal is prepared for notifying the use of the operation, and a drive signal is prepared with reference to the command signal for driving the vibrator in a different state of vibration. Upon receiving a usual incoming call, for example, a first drive signal is prepared wherein the variation of the vibration frequency continues, based on an incoming call notification command signal. Upon receiving an incoming call from a specified caller, on the other hand, a second drive signal is prepared which turns on and off with a predetermined period, based on a caller notification command signal. When the notifying device is driven with the first drive signal, resonance occurs with a predetermined period, whereas when the notifying device is driven with the second drive signal, resonance occurs intermittently periodically. This difference in the mode of vibration enables the user to identify the caller.

Further when an operation mode as a telephone is set, a drive signal is prepared wherein the variation of the frequency has a first period, based on a mode notification command signal. When other operation mode, for example, for the function of a pager is set, a drive signal is prepared wherein the variation of the frequency has a second period, based on a mode notification command signal concerned. Consequently, the different operation modes produce intermittently periodical resonance in different states. This difference in the state of vibration enables the user to identify the different operation modes.

Stated more specifically, the variation in the frequency of the drive signal corresponds to the variation in the resonance frequency due to tolerances for the specifications on which the resonance frequency is dependent. The variation in the resonance frequency due to tolerances for the specifications can be determined experimentally, empirically or theoretically, and the variation in the frequency of the drive signal can be determined reasonably when made to correspond to the variation thus determined.

For example, the resonance frequency of the vibrator is lower than audible frequencies and is more specifically a frequency of up to hundreds of hertz, and the vibration of the vibrator at the resonance frequency has an amplitude which is generally perceivable by the human body, whereby a perceivable notifying effect can be obtained.

The drive signal has an alternating waveform of pulses or sine waves and a frequency which periodically varies at one to several hertz. This periodically produces resonance with a period highly effective for perception by the human body. The frequency of the drive signal further varies in the form of triangular waves, sine waves or sawtooth waves. Especially when the frequency of the drive signal is varied in the form of sawtooth waves, resonance occurs with a definite period in match with the period of the waves, ensuring notification without discomfort. The frequency of the drive signal need not always be varied continuously but may be gradually increased or decreased stepwise.

With the wireless communications system according to the invention, periodic or nonperiodic occurrence of resonance, regardless of the variation in the resonance frequency, repeatedly increases the amplitude of the vibrator to the amplitude of resonance as a peak and decreases the amplitude from the peak, giving effective notification which is audible or perceivable by the human body. Further different states of vibration enable the user to identify the contents of notification.

BEST MODE OF CARRYING OUT THE INVENTION

A detail description will be given below of two embodiments of the invention as applied to the portable telephone shown in FIG. 9.

First Embodiment

Figure 9:
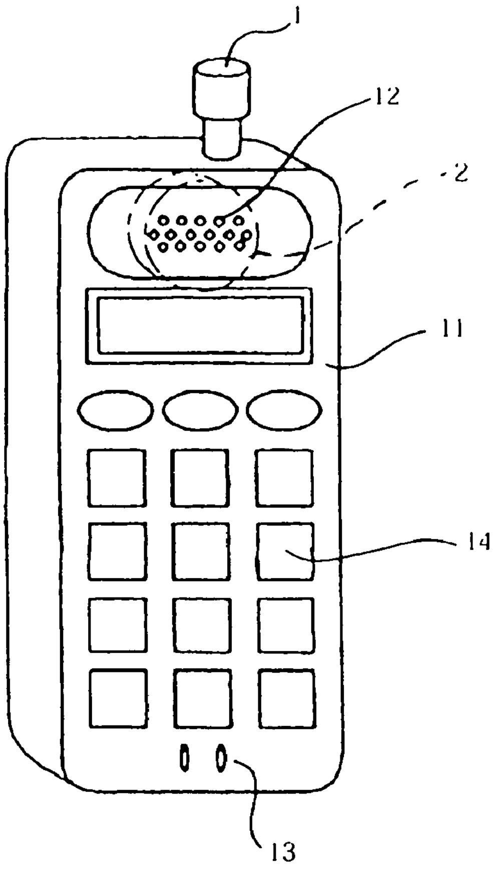
FIG. 9 is a perspective view showing the appearance of a portable telephone embodying the invention.

As shown in FIG. 9, the portable telephone of the invention comprises a flat case 11 having an antenna 1 and provided on the surface thereof with a speech receiving portion 12 incorporating a speaker, manual buttons 14 such as numerical keys, a speech delivery portion 13 incorporating a microphone, etc. Provided in a suitable portion of the interior of the case 11 is a notifying unit 2 for notifying the user of incoming calls with sound or vibration.

Figure 2:
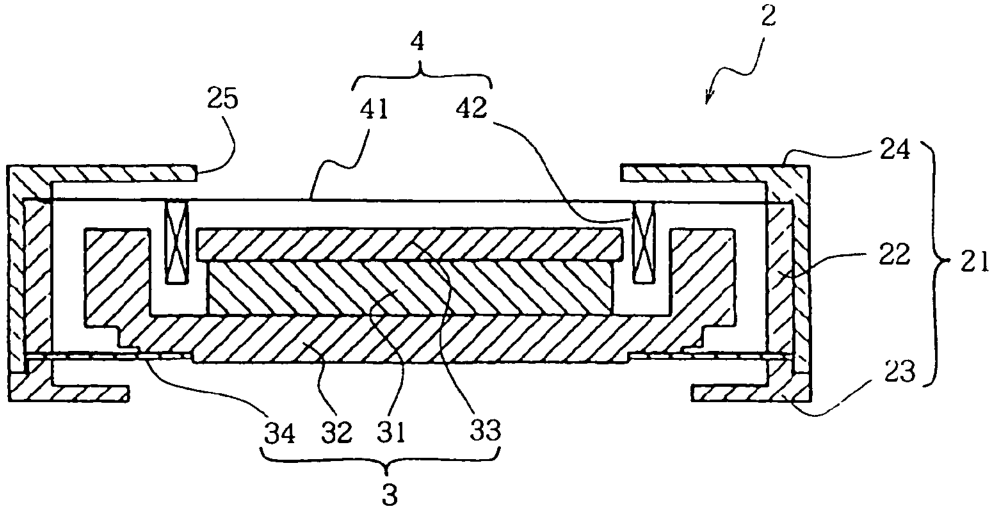
FIG. 2 is an enlarged view in section of a notifying unit.

As shown in FIG. 2, the notifying unit 2 comprises as housed in a common casing 21 a first vibrator 4 for producing sound mainly and a second vibrator 3 for producing vibration mainly. The casing 21 comprises a hollow cylindrical body 22, an annular front cover member 24 having a sound emitting aperture 25 and attached to an open front side of the body 22, and an annular rear cover member 23 attached to an open rear side of the body 22.

The first vibrator 4 comprises a circular first diaphragm 41 having its peripheral portion held between the casing body 22 and the front cover member 24, and a coil 42 fixed to the rear side of the first diaphragm 41. The first vibrator 4 has a resonance frequency in an audible range in excess of hundreds of hertz.

On the other hand, the second vibrator 3 comprises an annular second diaphragm 34 having its peripheral portion held between the casing body 22 and the rear cover member 23, an outer yoke 32 secured to the inner peripheral portion of the second diaphragm 34, a permanent magnet 31 magnetized axially thereof (vertical direction) and fixed to the front side of the outer yoke 32, and an inner yoke 33 fixed to the front side of the magnet 31. The coil 42 of the first vibrator 4 is accommodated upwardly or downwardly movably in an annular magnetic gap defined by opposed faces of the outer yoke 32 and the inner yoke 33. The second vibrator 3 has a resonance frequency in an actually inaudible frequency range, for example, of 50 Hz to 300 Hz.

The first and second diaphragms 41, 34 can be made from a known elastic material such as metal, rubber or resin. When required, the second diaphragm 34 has cuts so as to obtain a great displacement.

Figure 1:
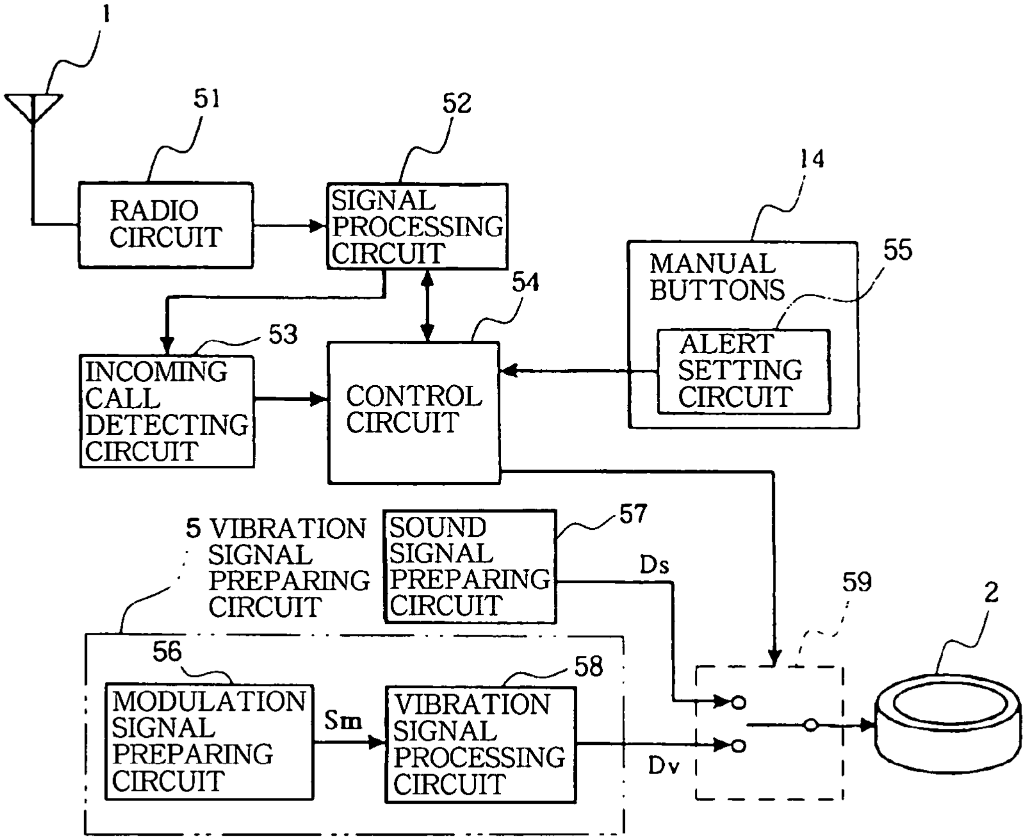
FIG. 1 is a block diagram showing the circuit construction of a portable telephone of first embodiment of the invention.

FIG. 1 shows the construction of the main circuit of the portable telephone having the notifying unit 2 described. The telephone is so adapted that when pressed, the manual button 14 enables the user to select notification with sound or notification with vibration for alerting the user to incoming calls. In conformity with the selection thus made, an alert setting circuit 55 sets the selected alerting method for a control circuit 54.

A sound signal preparing circuit 57 and a vibration signal preparing circuit 5 are connected to the notifying unit 2 by way of a switch 59, which is changed over under the control of the control circuit 54.

Radio waves transmitted by the base station are received by the antenna 1 at all times with a specified period. The signal received is frequency-converted and demodulated by a radio circuit 51 and then fed to a signal processing circuit 52, which extracts a digital sound signal and a control signal from the signal. The operation of the signal processing circuit 52 is controlled by the control circuit 54.

The control signal obtained by the signal processing circuit 52 is fed to an incoming call detecting circuit 53, whereby an incoming call is detected if any. On the other hand, the sound signal given by the circuit 52 is fed to an unillustrated sound signal processing circuit and then output from the speaker as sound.

The sound signal preparing circuit 57 serves to produce a sound drive signal Ds of audible frequency for notification with sound. On the other hand, the vibration signal preparing circuit 5, which produces a vibration drive signal Dv having a low frequency of up to hundreds of hertz for notification with vibration perceivable by the body, comprises a modulation signal generating circuit 56 and a vibration signal processing circuit 58. The constructions of these circuits 56 and 58 will be described later in detail.

When an incoming call is detected by the detecting circuit 53, the control circuit 54 changes over the switch 59 in accordance with the alert setting by the manual button 14. In the case where the user is to be notified of the incoming call with sound only, the switch 59 is changed over for connection to the sound signal preparing circuit 57 to feed the sound drive signal alone to the notifying unit 2. When notification is to be given only with vibration, the switch 59 is changed over for the vibration signal preparing circuit 5 to feed the vibration drive signal alone to the notifying unit 2.

Figure 10:
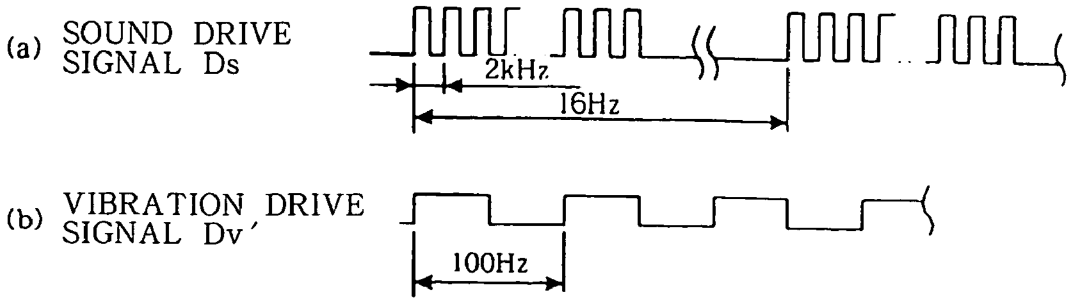
FIG. 10 includes waveform diagrams showing a sound drive signal and a vibration drive signal of a conventional portable telephone.
Figure 11:
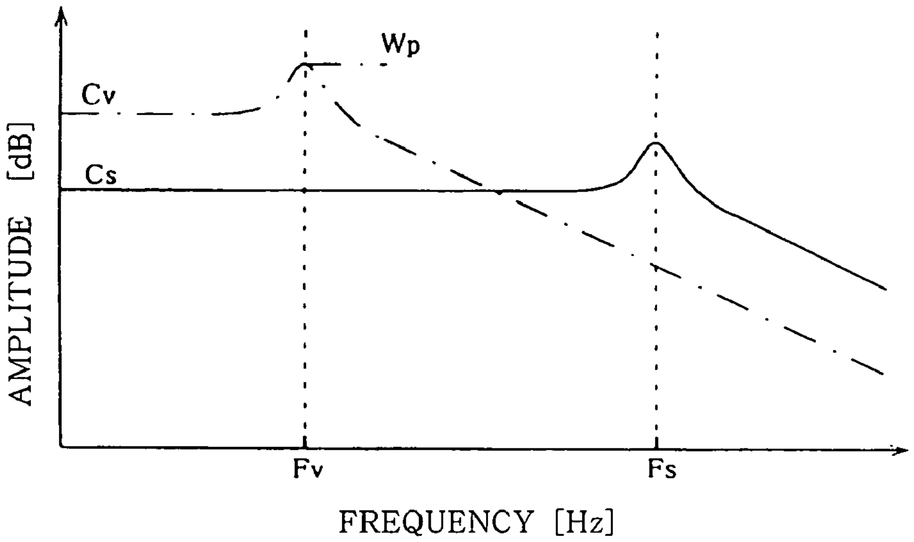
FIG. 11 is a graph showing the vibration characteristics of vibrators.
Figure 12:
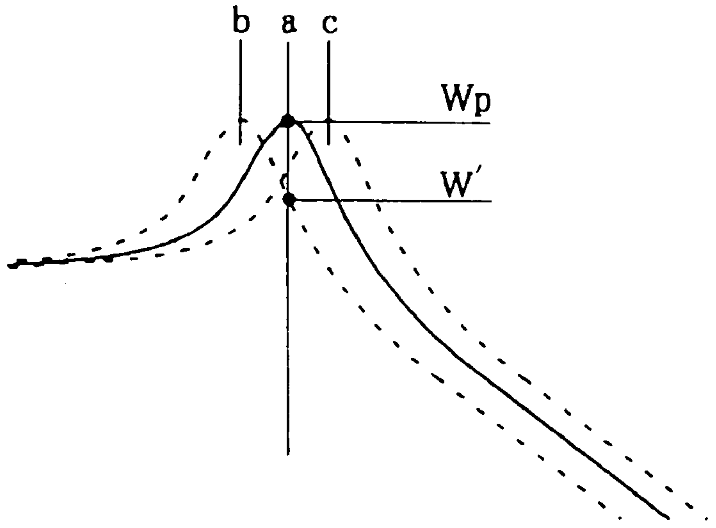
FIG. 12 is a diagram for illustrating a decrease in amplitude due to variations in resonance frequency.

With reference to FIG. 10, (a), the sound drive signal Ds produced by the sound signal preparing circuit 57 is prepared from a pulse signal having a frequency of 2 kHz in the audible range by rendering the signal intermittent at a period of 16 Hz. The resulting intermittent pulses provide a readily audible notifying sound which sounds like "pulll . . . . " The frequency of 2 kHz matches the resonance frequency Fv of the vibration characteristics Cs shown in FIG. 11.

Figure 4:
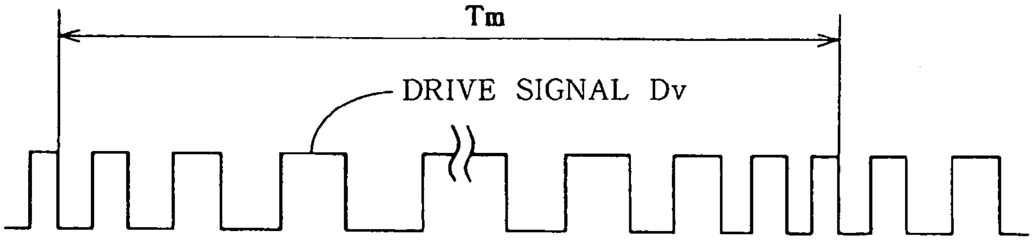
FIG. 4 is a waveform diagram of the drive signal.

On the other hand, the vibration drive signal Dv prepared by the vibration signal preparing circuit 5 has a frequency periodically varying in the range, for example, of 100 Hz±10 Hz and centered about approximately 100 Hz that is easily perceivable by the human body as a vibration as shown in FIG. 4. The center frequency 100 Hz is in match with the resonance frequency Fv of the vibration characteristics Cv shown in FIG. 11.

Figure 3:
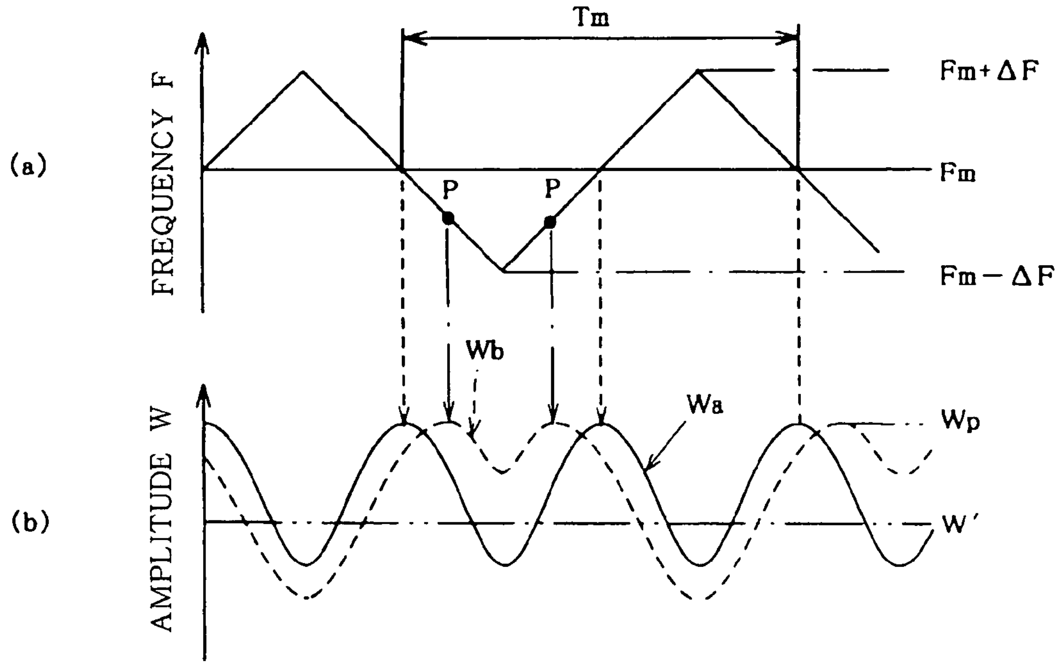
FIG. 3 includes waveform diagrams showing the relationship between the frequency of a drive signal and the amplitude of a vibrator.

FIG. 3, (a) shows an example wherein the frequency F of the vibration drive signal Dv is varied in the form of triangular waves. The frequency F has a variation of ±ΔF=±10 Hz with a center frequency of Fm=100 Hz. The variation frequency (1/Tm) is in the range of 0.5 to 10 Hz. The variation ±ΔF of the frequency is determined in accordance with the variation of the resonance frequency of the second vibrator 3 due to tolerances for the specifications on which the resonance frequency is dependent.

Suppose the resonance frequency of the second vibrator 3 involves no variation in this case. Resonance then occurs when the frequency F matches the center frequency Fm, and an amplitude curve Wa indicated in a solid line in FIG. 3, (b) is obtained which has a peak amplitude Wp at the resonance point.

Further suppose the resonance frequency of the second vibrator 3 involves a variation due to dimensional tolerances for the diaphragm, etc. The true resonance point will then be positioned, for example, at point P in FIG. 3, (a). Even in this case, resonance occurs when the frequency F of the drive signal passes this point P, and an amplitude curve Wb is obtained which has a peak amplitude Wp at the resonance point as indicated in a broken line in FIG. 3, (b).

Thus, by varying the frequency of the vibration drive signal Dv over the range of Fm±ΔF, an amplitude can be obtained which varies to exhibit a peak Wp always at the resonance point despite the variation of the resonance frequency, consequently producing a satisfactory notifying effect. This amplitude variation achieves an enhanced notifying effect which is perceivable by the human body.

In the case where the second vibrator 3 is driven at a constant frequency Fm, on the other hand, no resonance occurs if the resonance frequency of the second vibrator 3 varies, and the amplitude of the second vibrator 3 has a small value W' greatly decreased from the peak value Wp at the resonance point as indicated in a two-dot chain line in FIG. 3, (b), consequently failing to produce a satisfactory notifying effect.

Figure 5:
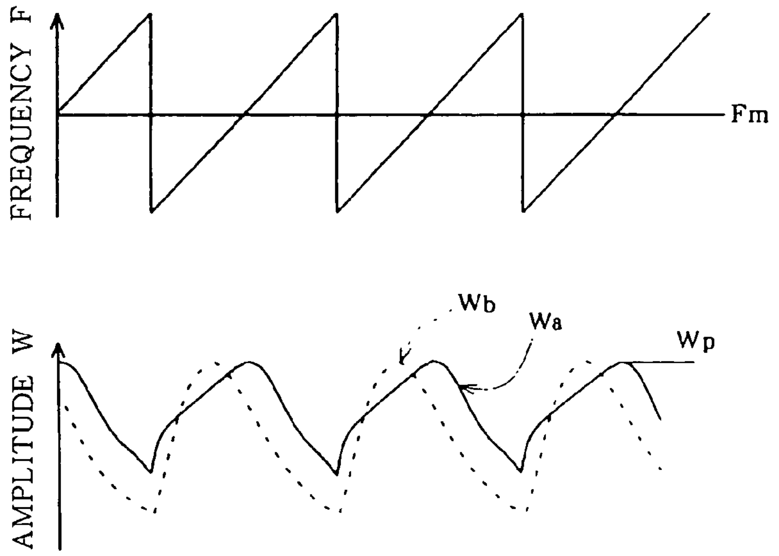
FIG. 5 includes waveform diagrams showing the relationship between the frequency of a drive signal and the amplitude of a vibrator as another example.

The frequency of the vibration drive signal Dv is variable not only in the form of triangular waves but also in the form of sine waves or sawtooth waves. For example, in the case where the frequency is varied in the form of sawtooth waves as shown in FIG. 5, (a), suppose the resonance frequency of the second vibrator 3 has no variation. An amplitude curve Wa is then obtained which has a peak amplitude Wp at the resonance point as indicated in a solid line in FIG. 5, (b). Even if the resonance frequency of the second vibrator 3 involves a variation, a resonance curve Wb will be obtained which has a peak amplitude Wp at the resonance point as indicated in a broken line in FIG. 5, (b). Notification without discomfort is realized especially in this case since the second vibrator 3 resonates at a definite period.

Figure 6:
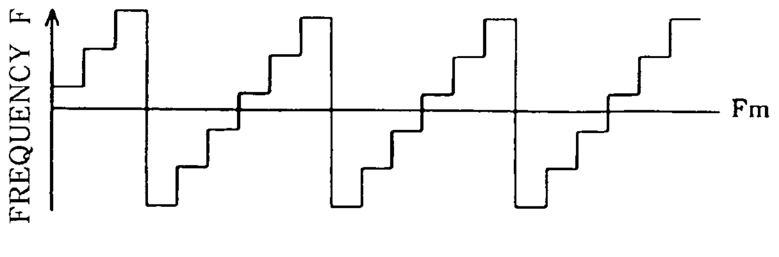
FIG. 6 is a waveform diagram showing variations in the frequency of a drive signal as another example.

Alternatively, the frequency of the vibration drive signal Dv can be gradually increased or decreased stepwise in minute frequency increments or decrements as shown in FIG. 6. The same effect as above is available also in this case.

According to the present embodiment, the vibration signal preparing circuit 5 comprises a modulation signal generating circuit 56 and a vibration signal processing circuit 58 as shown in FIG. 1. The modulation signal generating circuit 56 produces a modulation signal Sm for modulating the frequency of the vibration drive signal. The modulation signal is prepared in the same waveform as the frequency variation waveform of the vibration drive signal shown in FIG. 3, (a) or FIG. 5, (a). Such a modulation signal can be prepared by a signal generating circuit already known.

Figure 7:
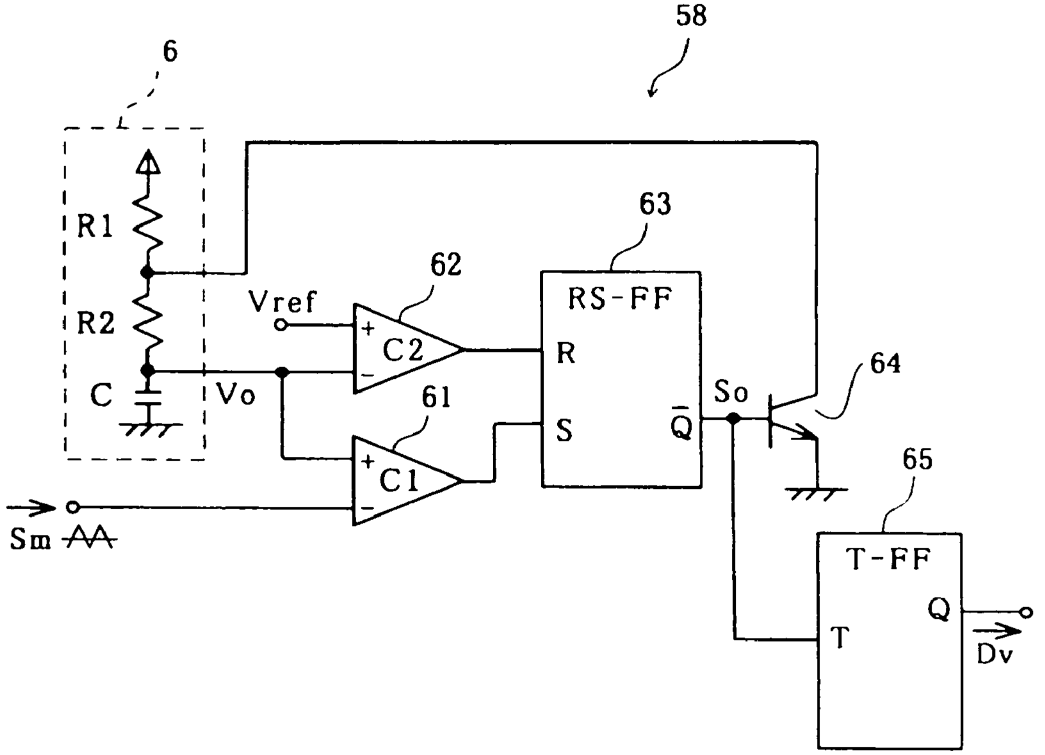
FIG. 7 is a block diagram showing the construction of an example of vibrating signal processing circuit.

On the other hand, the vibration signal processing circuit 58 can be, for example, of the construction shown in FIG. 7. The circuit 58 comprises a charging unit 6 composed of a capacitance element C and resistance elements R1, R2, an RS-flip-flop circuit 63 connected to the output terminal of the unit 6 via a first comparator 61 and a second comparator 62, and a discharge control transistor 64 and a T-flip-flop circuit 65 which are connected to the output terminal of the circuit 63. The modulation signal Sm is fed to an inversion input terminal of the first comparator 61, and a reference voltage signal Vref to a noninversion input terminal of the second comparator 62.

Figure 8:
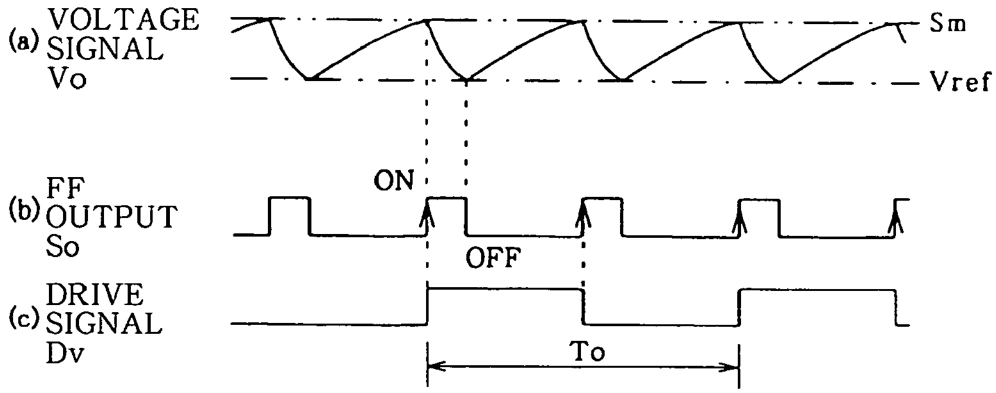
FIG. 8 includes waveform diagrams showing the operation of the vibrating signal processing circuit.

FIG. 8 shows the operation of the vibration signal processing circuit 58. The charging unit 6 is charged by being supplied with power, whereby a voltage signal Vo output from the charging unit 6 is gradually increased. Upon the magnitude of the signal reaching the level of the modulation signal Sm, the first comparator 61 feeds a set signal to the RS-flip-flop circuit 63, turning on an output So of the circuit 63. Consequently, the transistor 64 is brought into conduction, starting to discharge the charging unit 6.

When the voltage signal Vo delivered from the charging unit 6 thereafter lowers to the level of the reference voltage signal Vref, the second comparator 62 is turned on to feed a reset signal to the RS-flip-flop circuit 63 and turn off the output of the circuit 63. As a result, the transistor 64 is brought out of conduction for the charging unit 6 to resume charging.

In this way, the charging unit 6 is repeatedly charged and discharged (FIG. 8, (a)), and the output So of the RS-flip-flop circuit 63 is turned on and off repeatedly (FIG. 8, (b)). In this process, the output of the T-flip-flop circuit 65 is switched from on to off, and from off to on as timed with the rise of the output So.

As a result, the T-flip-flop circuit 65 produces a drive signal Dv which is turned on and off every time the voltage signal Vo reaches the level of the modulation signal Sm as shown in FIG. 8, (c). The modulation signal Sm varies, for example, in the form of triangular waves, whereby the period To of the drive signal Dv is also varied in the form of triangular waves, so that a modulation drive signal Dv is obtained as shown in FIG. 4.

Figure 13:
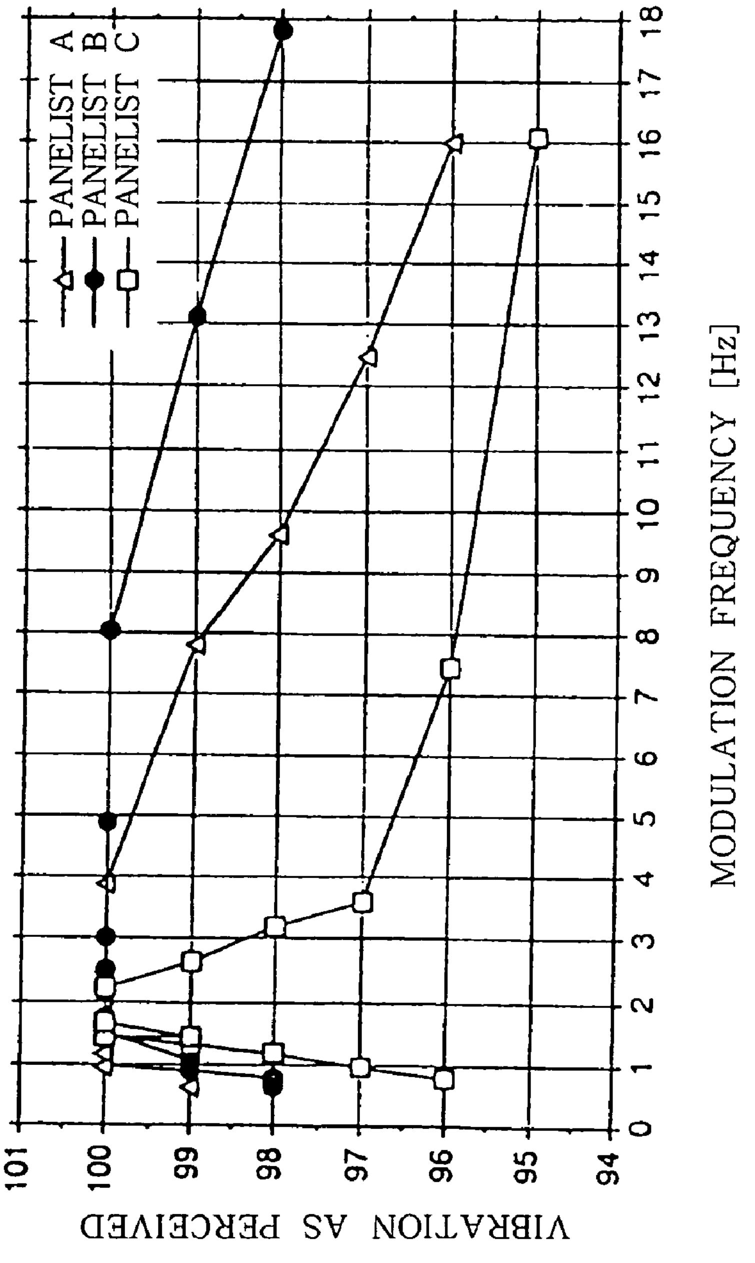
FIG. 13 is a graph showing the result of an experiment conducted for determining an optimum range of modulation frequencies.

To check the variation frequency having a period To of the modulation drive signal Dv, i.e., the frequency of the modulation signal Sm, for an optimum range, an experiment was first conducted to examine the notifying effect perceived by three panelists (A, B, C). For the experiment, a wireless communications system (pager) of the invention was placed on the palm of each panelist, the modulation frequency was then altered continuously, and the panelist was asked to report the feeling of the vibration as perceived. The value to be reported was an optional value ranging from 0 representing no vibration as sensed to 100 representing a vibration as perceived with the highest sensitivity. Further in the experiment, the modulation frequency was first explored which resulted in a vibration as sensed with the evaluation of 100, and the modulation frequency was thereafter altered gradually for the panelist to make a report upon perceiving a change in the vibration as sensed. FIG. 13 shows the result.

FIG. 13 reveals that all the three panelists perceived the vibration with the highest sensitivity when the modulation frequency was 1.5 to 2.5 Hz, and that the sensitivity decreased as the frequency departed from this range. Although the decrease in the sensitivity to the vibration differs from person to person, the panelists were alike in the tendency of sensitivity variations as apparent from the result. It is therefore thought that FIG. 13 shows the basic variation pattern of perception characteristics.

Next, an experiment was conducted with ten panelists (a to j). The wireless communications system (pager) of the invention was placed on the palm of each panelist, the variation frequency was then altered continuously, and the panelist was asked to report the modulation frequency (optimum modulation frequency) at which the vibration was perceived with the highest sensitivity. Table 1 shows the result.

TABLE 1

| Panelist | Optimum modulation frequency [Hz] |
|---|---|
| a | 2.25 |
| b | 2.31 |
| c | 2.10 |
| d | 2.03 |
| e | 2.77 |
| f | 2.11 |
| g | 2.29 |
| h | 1.85 |
| i | 1.83 |
| j | 2.23 |
| Ave ± SD | 2.177 ± 0.268 |

Since the optimum modulation frequency slightly differs from person to person as will be apparent from the table, the average value of the listed values, Ave=2.177 Hz, can be used as a universal optimum modulation frequency. Further the standard deviation SD of the optimum modulation frequencies listed in Table 1 is 0.268, so that if the modulation frequency is set within a range (Ave±3SD) three times the standard deviation centered about the average value Ave, i.e., within the range of 1.37 to 2.98 Hz, a very high notifying effect can be given to almost all users.

Second Embodiment

A portable telephone embodying the invention has incorporated therein a notifying unit which has the same construction as the notifying unit 2 of the first embodiment shown in FIG. 2.

Figure 14:
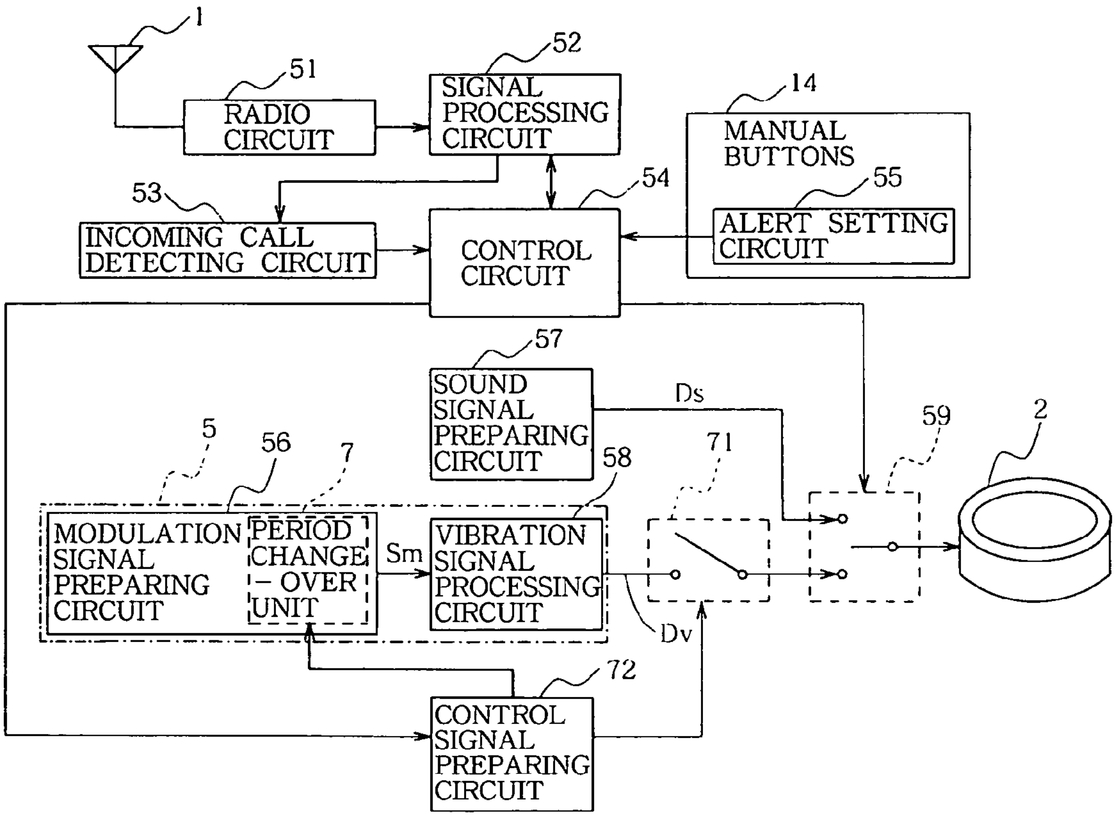
FIG. 14 is a block diagram showing the circuit construction of a portable telephone of second embodiment of the invention.

FIG. 14 shows the main circuit construction of the portable telephone of the present embodiment.

Throughout this circuit and the circuit of first embodiment shown in FIG. 1, like components are designated by like reference numerals and will not be described repeatedly.

The sound signal preparing circuit 57 serves to produce a sound drive signal Ds of audible frequency for notification with sound as in the first embodiment. On the other hand, the vibration signal preparing circuit 5, which produces a vibration drive signal Dv having a low frequency of up to hundreds of hertz for notification with vibration perceivable by the body, comprises a modulation signal generating circuit 56 and a vibration signal processing circuit 58. The constructions of these circuits 56 and 58 will be described later in detail.

An on/off switch 71 is interposed between the vibration signal preparing circuit 5 and the change-over switch 59. The modulation signal generating circuit 56 and the on/off switch 71 have their operations controlled by a control signal preparing circuit 72.

As shown in FIG. 14, the modulation signal generating circuit 56 has a period change-over unit 7. A control signal fed to this unit 7 from the control signal preparing circuit 72 changes the period of the modulation signal Sm to be fed to the vibration signal processing circuit 58.

Figure 15:
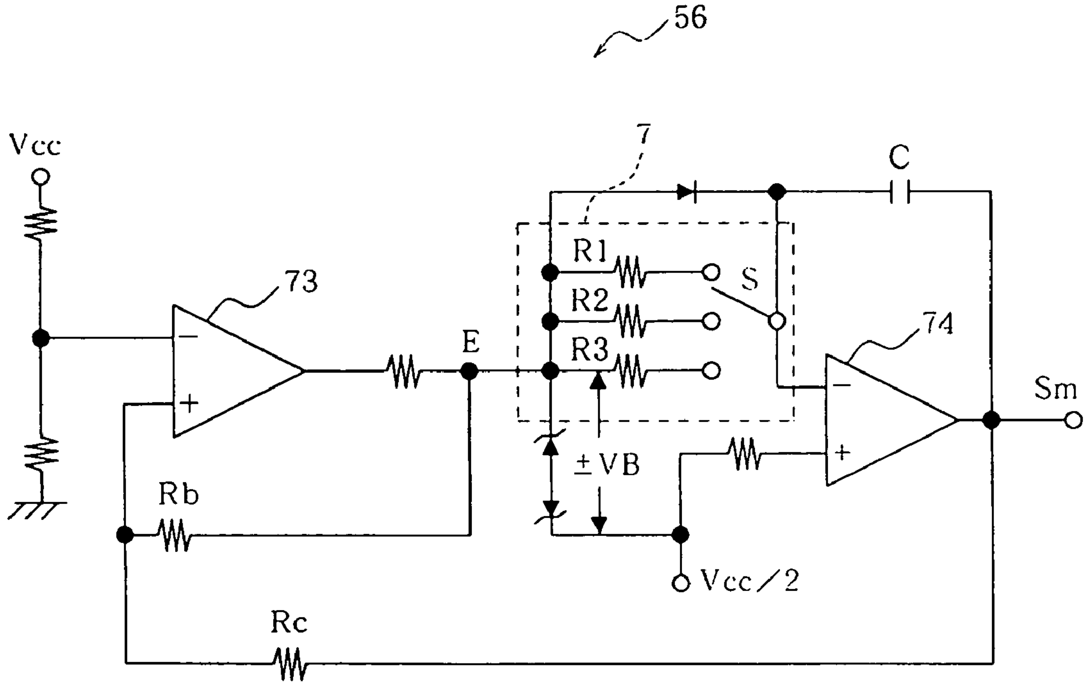
FIG. 15 is a diagram showing the construction of an example of modulation signal generating circuit.
Figure 16:
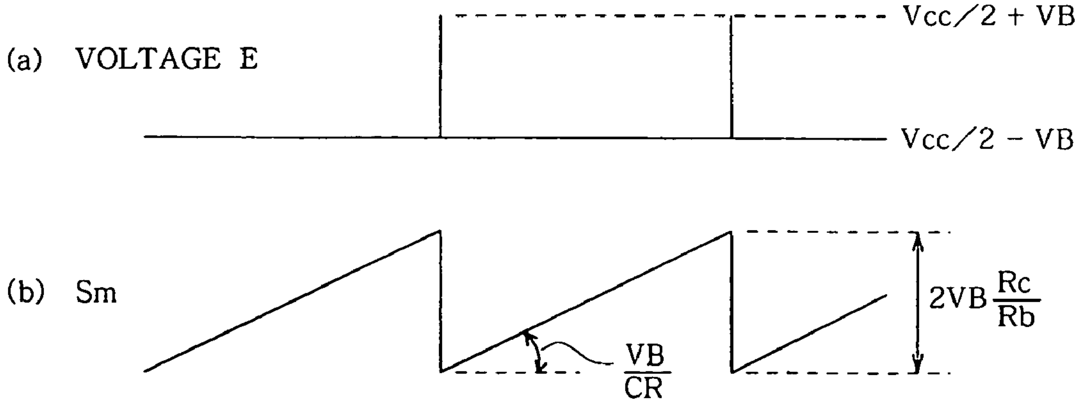
FIG. 16 includes waveform diagrams showing the operation of the modulation signal generating circuit.

FIG. 15 shows a specific example of construction of the modulation signal generating circuit 56, and FIG. 16, (a) and (b) show the operation of the circuit 56. The circuit 56 comprises first and second comparators 73, 74, a plurality of parameter selecting resistors R1, R2, R3, change-over switch S, feedback resistors Rb, Rc, capacitor C, etc. The parameter selecting resistors R1, R2, R3 and change-over switch S constitute the period change-over unit 7. The switch S is changed over by the control signal fed from the control signal preparing circuit 72. Consequently, the slope (VB/CR) of the output voltage (modulation signal Sm) of the second comparator 74 shown in FIG. 16, (b) varies in accordance with the resistance value R of the parameter selecting resistor. Further every time the voltage E at point E in FIG. 15 increases from (E=Vcc−VB) to (E=Vcc+VB) as shown in FIG. 16, (a), the output voltage of the second comparator 74 drops, giving a sawtooth modulation signal Sm as shown in FIG. 16, (b). In this way, the period of the modulation signal Sm can be changed to one of different periods.

The control signal preparing circuit 72 prepares a change-over control signal for the switch S constituting the period change-over unit 7 and an on/off control signal for the on/off switch 71 in response to a mode notifying command signal obtained from the control circuit 54.

Figure 17:
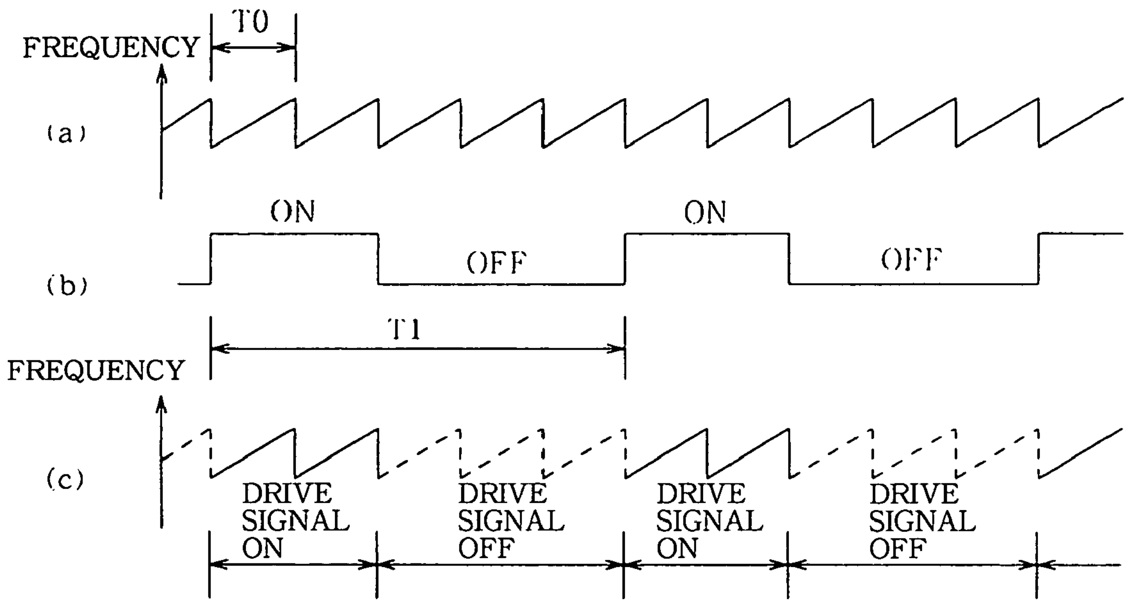
FIG. 17 includes waveform diagrams showing two kinds of modulation signals for use in operation mode identification.

For example, in the case where the system has registered therein the telephone number(s) of specified one or more than one callers, and when a call is received from an unregistered caller, the incoming call is detected by the incoming call detecting circuit 53, whereupon the control circuit 54 prepares a mode notifying command signal for giving a command to notify the user of reception of the call and feeds the command signal to the control signal preparing circuit 72. The circuit 72 in turn controls the period change-over unit 7 of the modulation signal generating circuit 56, whereby a modulation signal of sawtooth waves having a predetermined period T0 is generated as shown in FIG. 17, (a), and the on/off switch 71 is held on at all times. A drive signal varying in frequency in accordance with the modulation signal is fed to the notifying unit 2. As a result, the notifying unit 2 resonates with the period T0.

On the other hand, when a call is received from the registered caller, the incoming call is detected by the incoming call detecting circuit 53, whereupon the control circuit 54 prepares a mode notifying command signal for giving a command to notify the user of reception of the call and feeds the command signal to the control signal preparing circuit 72. The circuit 72 in turn controls the period change-over unit 7 of the modulation signal generating circuit 56, whereby a modulation signal of sawtooth waves having a predetermined period T0 is generated as shown in FIG. 17, (a), and the on/off switch 71 is turned on and off at a predetermined period T1 as shown in FIG. 17, (b). An intermittent drive signal with on/off repetitions as shown in FIG. 17, (c) is fed to the notifying unit 2. As a result, the notifying unit 2 resonates during the on-period of the drive signal and ceases to resonate during the off-period thereof. This enables the user to recognize the incoming call from the registered person.

Figure 18:
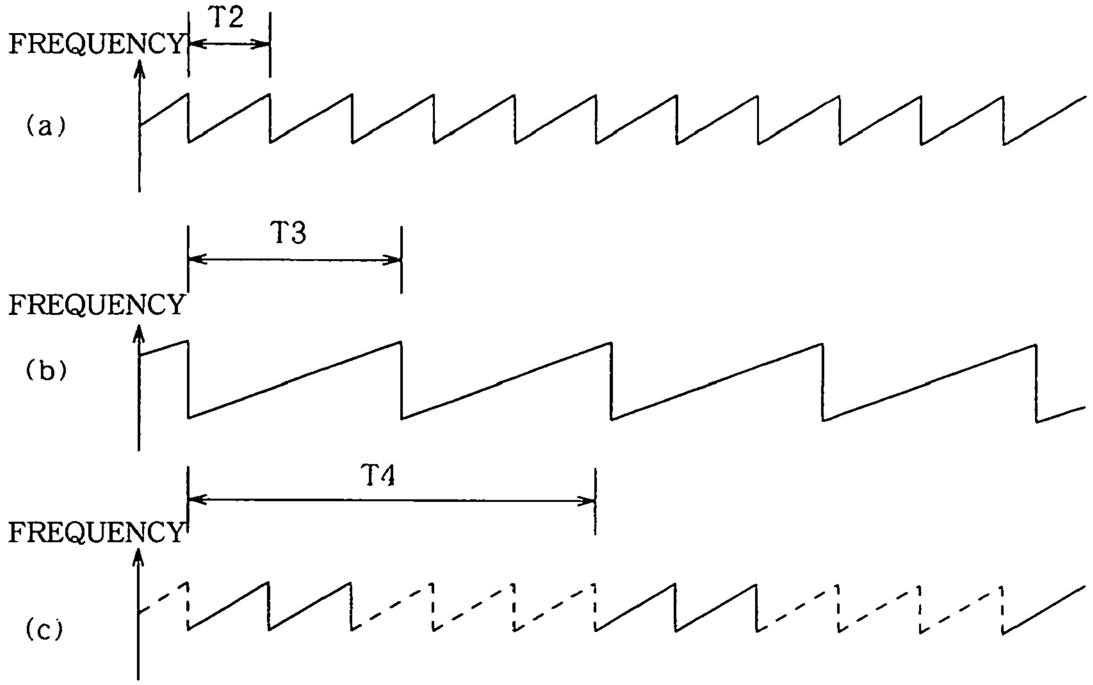
FIG. 18 includes waveform diagrams showing three kinds of modulation signals for use in operation mode identification.

In the case where the portable telephone has three operation modes for use as such, a pager and tranceiver and when the telephone is set in the operation mode of telephone, the control signal preparing circuit 72 controls the period change-over unit 7 of the modulation signal generating circuit 56 in response to an incoming call, whereby a modulation signal of sawtooth waves having a predetermined period T2 is generated as shown in FIG. 18, (a), and the on/off switch 71 is held on at all times. A drive signal varying in frequency in accordance with the modulation signal is fed to the notifying unit 2. As a result, the notifying unit 2 resonates at the period T2.

On the other hand, when the telephone is set in the operation mode of pager, the control signal preparing circuit 72 controls the period change-over unit 7 of the modulation signal generating circuit 56, whereby a modulation signal of sawtooth waves having a predetermined period T3 is generated as shown in FIG. 18, (b), and the on/off switch 71 is held on at all times. A drive signal varying in frequency in accordance with the modulation signal is fed to the notifying unit 2. As a result, the notifying unit 2 resonates at the period T3 which is different from that of FIG. 18, (a).

Further when the telephone is set in the operation mode of tranceiver, the control signal preparing circuit 72 controls the period change-over unit 7 of the modulation signal generating circuit 56, whereby a modulation signal of sawtooth waves having a predetermined period T2 is generated as shown in FIG. 18, (a), and the on/off switch 71 is turned on and off at a predetermined period T4. A drive signal with on/off repetitions at the period T4 as seen in FIG. 18, (c) is therefore fed to the notifying unit 2. Consequently, the notifying unit 2 resonates during the on-period of the drive signal and ceases to resonate during the off-period of thereof, intermittently resonating periodically.

Accordingly the different states of vibration described enable the user to recognize the incoming call in the particular operation mode.

The on/off switch 71 turned on and off by the control signal preparing circuit 72, preferably as timed with the rise and fall of the frequency variation of the modulation signal as shown in FIGS. 17, (c) and 18, (c).

As described above, with the portable telephone according to the invention, periodic or nonperiodic occurrence of resonance repeatedly increases the amplitude of the vibrator to the amplitude of resonance as a peak and decreases the amplitude from the peak, giving effective notification which is audible or perceivable by the human body. Moreover different states of vibration enable the user to identify the contents of notification.

The device and system of the present invention are not limited to the foregoing embodiments in construction but can be modified variously within the technical scope set forth in the appended claims. For example, the present invention is not limited to the notifying unit 2 having both a sound generator and a vibration generator in combination but can be applied also to a notifying device comprising a sound generator and a vibration generator as separate components. Furthermore, the vibrator of the notifying unit 2 is not limited to one utilizing a magnetic force but can be of any of various known constructions utilizing resonance. For example, one utilizing a piezoelectric element is usable.

According to the first embodiment, it is possible to use a microcomputer for constituting the vibration signal preparing circuit 5 and to prepare a modulation drive signal Dv like the one shown in FIG. 4 by software processing. It is also possible to use a microcomputer for providing the vibration signal preparing circuit 5 and the on/off switch 71 and to prepare the drive signal by software processing.

Further the contents of the notification to be made by the different states of vibration according to the second embodiment are not limited to the operation modes at the time of receiving incoming calls; the user can be thus notified, for example, of a battery voltage drop for alerting and various functional operations. Furthermore, the on/off control and on/off-period change-over of the drive signal shown in FIG. 17, (a), (c), can be combined with the change-over of variation period of the drive signal shown in FIG. 18, (a), (b) for the notification of many operations.

What is claimed is:

1. A notifying device comprising a vibrator to be resonated by a drive signal fed thereto, and a signal preparing circuit for feeding the drive signal to the vibrator at the time of a notifying operation, wherein a frequency of the drive signal varies in a range including a resonance frequency of the vibrator in the form of sawtooth waves, the sawtooth waves comprising a portion inclined with respect to a time base and a portion perpendicular to the time base.

2. A notifying device according to claim 1 wherein the variation of the frequency of the drive signal corresponds to a variation in the resonance frequency of the vibrator due to tolerances of specifications on which the resonance frequency is dependent.

3. A notifying device according to claim 1 wherein the resonance frequency of the vibrator is a low frequency of up to hundreds of hertz, and the vibration of the vibrator has at the resonance frequency an amplitude generally perceivable by the human body.

4. A notifying device according to claim 1 wherein the drive signal has an alternating waveform of rectangular waves or sine waves having a frequency periodically varying at 0.5 to 10 Hz.

5. A notifying device according to claim 4 wherein the frequency of the drive signal periodically varies at 1.37 to 2.98 Hz.

6. A notifying device according to claim 5 wherein the frequency of the drive signal periodically varies at 2.18 Hz.

7. A notifying device according to claim 1 wherein the vibrator comprises a casing, a diaphragm having a fixed end on an inner peripheral wall of the casing, a magnet attached to a free end of the diaphragm, and a coil disposed as opposed to the magnet, and the drive signal is fed to the coil.

8. A wireless communication system comprising a notifying device for notifying the user of incoming calls, the notifying device comprising a vibrator to be resonated by a drive signal fed thereto, and a signal preparing circuit for feeding the drive signal to the vibrator at the time of a notifying operation, wherein a frequency of the drive signal varies in a range including a resonance frequency of the vibrator in the form of sawtooth waves, the sawtooth waves comprising a portion inclined with respect to a time base and a portion perpendicular to the time base.

9. A wireless communication system having incorporated therein a notifying device for performing different kinds of notifying operations including notification of incoming calls, the notifying device comprising a vibrator to be resonated by a drive signal fed thereto, and a drive signal feed circuit for feeding the drive signal to the vibrator, wherein the drive signal feed circuit comprises:

command signal preparing means for preparing notification command signals which are different for different contents of notification in conformity with the content, and drive signal preparing means operative in response to the notification command signal to prepare a drive signal which has a frequency which varies in a range including a resonance frequency of the vibrator in the form of sawtooth waves, the sawtooth waves comprising a portion inclined with respect to a time base and a portion perpendicular to the time base.

10. A wireless communications system according to claim 9 wherein the drive signal prepared by the drive signal preparing means varies in frequency continuously in conformity with the notification command signal or intermittently at a specified period in conformity with the notification command signal.

11. A wireless communications system according to claim 9 wherein the drive signal prepared by the drive signal preparing means varies in frequency at a specified period in conformity with the notification command signal.

12. A wireless communications system according to claim 9 wherein the variation of frequency of the drive signal prepared by the drive signal preparing means corresponds to a variation in the resonance frequency of the vibrator due to tolerances for specifications which govern the resonance frequency.

13. A wireless communications system according to claim 9 wherein the resonance frequency of the vibrator is a low frequency of up to hundreds of hertz, and the vibration of the vibrator at the resonance frequency has an amplitude generally perceivable by the human body.

14. A wireless communications system according to claim 9 wherein the command signal preparing means prepares an incoming call notifying command signal for notifying the user of an incoming call, a caller notifying command signal for distinguishing callers, and/or a mode notifying command signal for notifying the user of an operation mode of the system.

15. A wireless communications system according to claim 9 wherein the vibrator of the notifying device comprises a casing, a diaphragm having a fixed end on an inner peripheral wall of the casing, a magnet attached to a free end of the diaphragm, and a coil disposed as opposed to the magnet, and the drive signal is fed to the coil.

* * * * *